Jan. 27, 1953 R. W. CURTIS 2,626,795
FLUID HEATING SYSTEM
Filed Sept. 10, 1948 2 SHEETS—SHEET 1

INVENTOR
Robert W. Curtis
BY
Moran
ATTORNEY

Patented Jan. 27, 1953

2,626,795

UNITED STATES PATENT OFFICE 2,626,795

FLUID HEATING SYSTEM

Robert W. Curtis, Alliance, Ohio, assignor to The Babcock & Wilcox Company, New York, N. Y., a corporation of New Jersey Application September 10, 1948, Serial No. 48,678

9 Claims. (Cl. 263—19)

The present invention relates to the construction and operation of fluid heaters of the moving bed type in which the heat transfer medium comprises a fluent mass of solid heat transfer material. The fluent solid material is circulated through the heater unit, flowing sequentially through one or more heat absorbing chambers and through one or more heat extraction chambers, with the heat absorption and heat extraction being effected respectively from and to gaseous fluid streams in direct contact with the heat transfer medium.

Fluid heaters of the type described usually employ small pieces or pellets of ceramic refractory materials, arranged in a fluent mass or bed, as the heat transfer medium and are capable of being continuously operated over extended periods of time at substantially higher temperatures than are permissible, or economically possible, with metallic heat exchangers. The walls of the heat exchange chambers confining the fluent beds of heat transfer medium are constructed of ceramic refractory materials having temperature resistant qualities corresponding generally to that of the fluent beds. This type of heater is particularly useful in continuously heating fluids at high temperatures, in the range of 2000 to 3000 F., or higher. Such operations may approach a temperature at which the material of the fluent beds becomes soft or sticky and the walls of the bed confining chambers lose some of their load carrying capacity. Ordinarily, it is desirable to select refractory materials having a softening temperature safely in excess of the temperatures to which it is exposed. However, economic reasons may necessitate heater operations with a narrow margin between the temperature of the fluent solid bed and the softening temperature of the refractory materials. Under these conditions of fluid heater operation it is essential that the bed of heat transfer material be uniformly heated and the chamber walls constructed and arranged so that they do not become heated in excess of a safe load carrying temperature. To attain uniform temperatures is primarily a problem of fluid distribution in its contact with the moving mass of solids, and of maintaining a substantially uniformly distributed and continuous movement of the solids through the fluid-solid contact zones. Such a problem is particularly difficult in the solid heat transfer material heating zone due to high temperatures prevailing therein.

The fluid and solid material flow distribution problem is further accentuated in high capacity fluid heaters. It will be understood that an increase in the heater capacity necessitates an increase in the volume of heating fluid flow and an increase in the cross-sectional area of solid heat transfer material. The depth of the solid material bed is a function of the desired temperature of the solid material delivered from the heating zone, and ordinarily, will not be essentially altered in the design of fluid heaters for various specific capacities for the same general heating temperature requirements.

The main object of the present invention is to provide fluid heating apparatus of the type described which is characterized by its high heat transfer capacity and its ability to heat fluids continuously to a substantially uniform high temperature. A further and more specific object is to provide a plurality of separate heat exchange chambers with each arranged to maintain a substantially uniform bed of moving gaspervious solid heat transfer material therein as received from and discharged to common containers, and to contact the beds of material in each chamber with substantially equal streams of gaseous fluids from a common source. A further object is to provide a plurality of separate pellet heating chambers each confining a moving mass of fluent solid heat transfer material heated by direct contact with a gaseous heating fluid obtained from a common source, and the exterior pellet confining walls of each heating chamber are maintained within a safe operative temperature. An additional specific object is to provide high capacity apparatus of the type described which is economical in construction and in operation, and is capable of high temperature operation over extended periods.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a practical embodiment of my invention.

Figure 4:
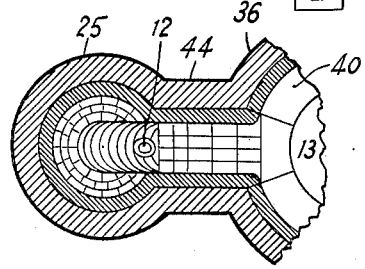
Figure 3:
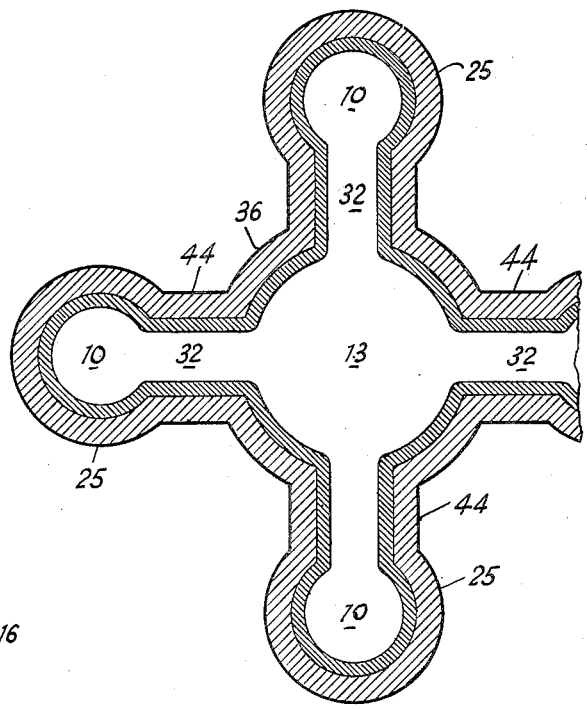
Figure 5:
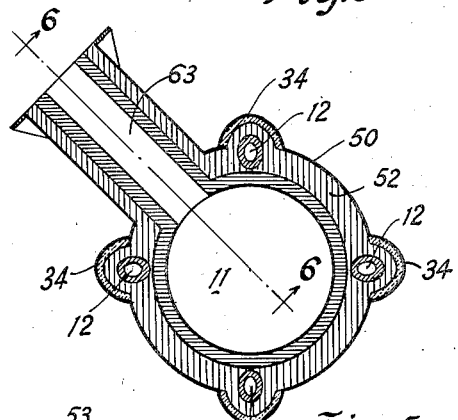
Figure 6:
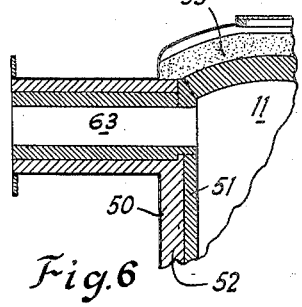
Figure 2:
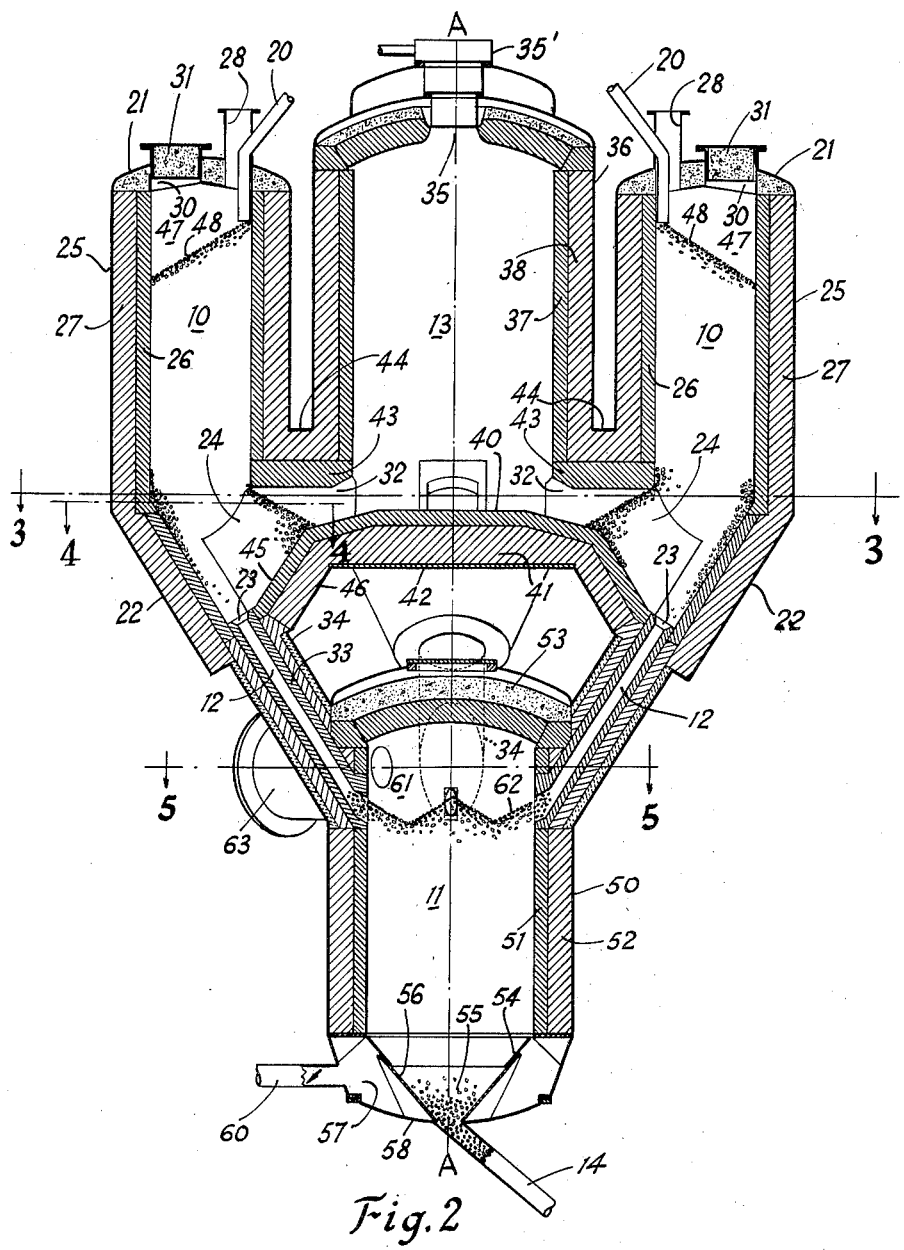
Fig. 2 is an enlarged elevation, in section, of a portion of the apparatus shown in Fig. 1.

Figs. 3, 4 and 5 are sectional views taken along the lines 3—3, 4—4 and 5—5, respectively, of Fig. 2; and Fig. 6 is a sectional view taken along the line 6—6 of Fig. 5.

While various features of my improved apparatus are adapted for use in any high temperature fluid-solid contact apparatus, the apparatus described herein is especially useful in the continuous high capacity heating of a moving mass of fluent solid material to a high temperature by direct contact heat exchange with a heating fluid.

Figure 1:
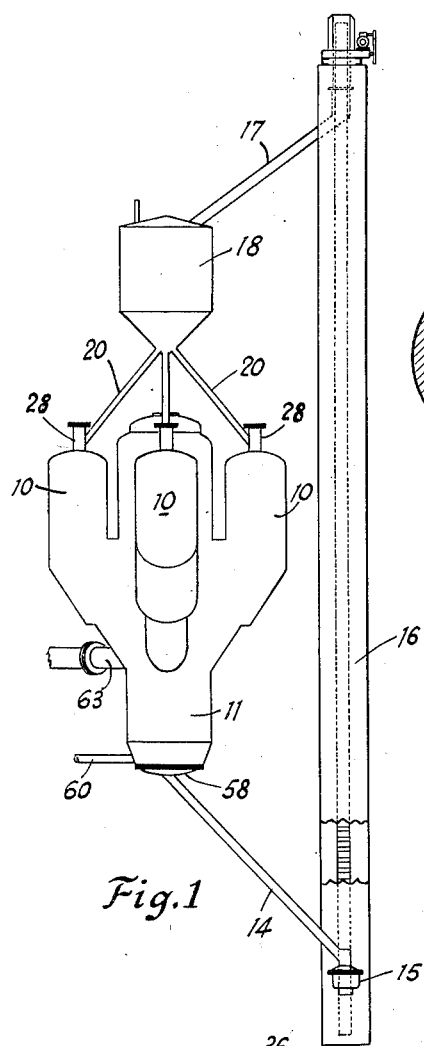
Fig. 1 is an elevation of a fluid heating apparatus constructed in accordance with the present invention.

In general, as shown in Fig. 1, the fluid heater includes a plurality of upper heating chambers 10 arranged in equal circumferentially spaced positions about a vertical axis A—A. A lower chamber 11 is positioned beneath the heating chambers 10 and is connected therewith by a series of tubes or throat conduits 12, each of which opens to one of the chambers 10 at its upper end and opens to the lower chamber 11 at its lower end. A fluent mass or bed of downwardly moving solid heat transfer material or pellets is maintained in the upper chambers 10, lower chamber 11 and the conecting conduits 12. The pellets are heated in the upper chambers 10 by direct contact heat exchange with a gaseous heating fluid, and cooled in the lower chamber by direct contact heat exchange with a gaseous fluid to be heated.

The heating fluid for heating the pellets in the chambers 10 consists of the gaseous products of combustion produced in a furnace 13 located centrally of the chambers 10 and directed into heating contact with a substantially uniformly distributed flow into and through the downwardly moving beds of pellets maintained within the chambers 10. The heated pellets discharge through the conduits 12 into the chamber 11, where a separate fluid is heated by direct contact heat exchange therewith. The pellets are cooled thereby and discharge through a centrally located tube or spout 14 in the bottom of chamber 11 to a feeder 15. The feeder 15 is of a suitable mechanical type arranged to regulate the withdrawal of pellets through the spout and thus, the rate of pellet flow through the fluid heating apparatus. The pellets are discharged by the feeder into the loading boot of a bucket elevator 16, or other elevating or conveying means, which delivers the pellets through a discharge spout 17 into a surge bin 18 located above the chamber 10. A plurality of feed pipes 20 direct the gravitational movement of the pellets from the bottom of the bin 18 to the upper portion of each of the chambers 10 for reuse in the heat exchange process.

A relatively wide range of refractory material can be used in forming the heat transfer pellets, the material selected depending upon the particular operating conditions to be maintained within the fluid heating unit. In general, the material should have a high strength and hardness, substantial resistance to thermal shock, and a high softening temperature. Such materials may be natural or manufactured ceramic refractories, corrosion resistant alloys or alloy steels, in small pieces of regular or irregular shape. Substantially spherical pellets of manufactured ceramic refractories have been successfully used. The pellets should be of a size such as to provide a large surface area for transfer of heat in the beds and of a density sufficient to withstand a high fluid flow velocity through the pellet mass without lifting. One desirable size of ceramic refractory pellet has been found to be approximately $\frac{5}{16}$ inch in diameter, but the size may be varied above and below that value, depending upon the desired operating conditions in the fluid heater.

As shown in Figs. 2, 3 and 4, the illustrated embodiment of the present invention includes a group of four upper heating chambers 10 in equally spaced positions symmetrically arranged about the centrally located furnace 13. Each of the chambers 10 is constructed as a vertically elongated cylinder having a domed top 21 and a tapering bottom 22 with a lower pellet outlet 23 and a side inlet 24 for the admission of the heating fluid. The wall of each chamber is defined by an outer metallic shell 25 protected by an inner lining of high temperature refractory material 26 and an intervening layer of insulating material 27. The domed top is lined by a protective layer of poured refractory material and provided with an inlet opening to accommodate the feed spout 20. A stack connection 28 is inserted in an opening in the domed top 21 for the discharge of spent heating fluid from the chamber. An access opening 30 is also provided in the top 21 and is normally closed by a cover 31.

The tapered bottom 22 of each chamber 10 is constructed to provide a pellet flow path merging into the upper end of a corresponding throat conduit 12. The upper end portion of the bottom 22 is shaped as an inverted truncated cone with its lower end corresponding in diameter with the width of a heating inlet vestibule 32, as hereinafter described, connecting the furnace 13 with the chamber. Below the frusto-conical portion of the bottom, the pellet supporting surface is formed as a continuation of the outer side of the cone and shape with a semi-circular section normal to the direction of downward pellet movement. The pellet outlet opening from the bottom of the chamber is in general vertical alignment with the inner surface of the lining 26 closest to the vertical axis A—A of the fluid heater.

Each of the throat conduits 12 is circular in section and is defined by an annular refractory wall 33 extending from an upper connection with the bottom 22 of the chamber 10 to a lower connection opening into the chamber 11. The refractory wall 33 of each throat is encased in an individual metallic casing 34 which is welded at opposite ends to the casings of the chambers 10 and 12 so as to provide a gas-tight closure for the pellet flow paths. In the illustrated embodiment of the invention, the chambers 10 are located about the vertical axis A—A common with the axis of chamber 11 and about which the throat conduits are symmetrically arranged. The throat passageways are of reduced cross-sectional area and are longitudinally elongated to provide adequate fluid pressure drop therethrough to assist in avoiding fluid leakage in either direction through the throat conduits.

The furnace 13 is shaped as a vertically elongated cylinder coaxial with axis A—A and provided with a domed top having a centrally located burner port 35 and burner 35′ therein. The outer surface of the furnace is encased in a metallic casing 36 having a diameter sufficient to allow a clearance inwardly from the adjacent portions of the casings 25 of the chambers 10. Within the casing 36, the inner surface of the furnace is provided with a layer of high temperature refractory material 37. A layer of insulating material 38 is provided against the metallic casing. A substantially flat, horizontal layer of refractory material 40 is supported upon insulation 41 and a metallic plate 42 to form the furnace bottom.

Four circumferentially equally spaced heating fluid outlet vestibules 32 are provided in the lower portion of the furnace 13 upwardly adjacent the refractory material 40. Each vestibule is radially arranged with its horizontal axis intersecting the vertical axis of the furnace and the corresponding chamber 10. As shown in Figs. 3 and 4 the width of the vestibule is uniform throughout its length with its side walls merging into the curved surfaces of the chamber bottom 22. The upper surfaces of the vestibules are defined by a refractory arch 43 which is provided with suitable insulation and an enclosing curved metallic plate 44 which is welded to the adjoining portions of the casings 25 and 36. The vestibules 32 are each provided with a downwardly flaring lower surface 45 of refractory material defining at its lower end one side of the outlet 23. The lower surface is backed by suitable insulating material and a metallic plate 46 which is welded to the plate 42 at its upper end, on its sides to the plate 44, and on its lower end to the conduit casing 34. The construction described and shown provides a vestibule for flow of heating fluid which is generally rectangular in cross-section with an outwardly increasing area.

A fuel burner 35' is arranged in the burner port opening 35 for the delivery of a mixture of fluid fuel and combustion air to the furnace. The gaseous products of combustion generated in the furnace 13 pass through the vestibules 32 into the upper heating chambers 10 for upward flow through the pellet beds in heat exchange contact therewith. The arrangement described is such as to insure an essentially equal distribution of heating gas flow to each of the chambers 10 and, with an essentially equal flow rate of pellets through each of the chambers, the pellet discharge temperature into the lower chamber 11 will also be essentially equal in each quadrant thereof. This desirable result is attained by maintaining the depth of pellet mass in the chambers 10 essentially equal so that the resistance to gas flow through each of the beds is equal to each other bed. Thus, with equal gas pressure at the entrance to each vestibule 32 and equal pressures in each space 47 above the upper surface 48 of the pellets in each chamber, the gas flow through each pellet bed is essentially equal to every other bed. With equal rates of pellet flow through each of the chambers 10 the pellet temperatures delivered to the chamber 11 will therefore be substantially uniform transversely of that chamber. The flow rate of pellets through the upper heating chambers is largely determined by the construction of the lower chamber and the arrangement of the throat conduits 12.

The chamber 11 is enclosed by a cylindrical metallic shell 50 protected by an internal refractory lining 51, and an intervening layer of insulating material 52. The chamber is provided with a domed cover 53 and a lower inverted frusto-conical metallic plate portion 54. The lower portion 54 ends in a centrally positioned outlet opening 55 corresponding with the upper end of the spout 14. As shown in Fig. 2, the lower section 56 of the portion 54 is perforated for the admission of a gaseous fluid into the pellet bed within the chamber 11. An annular fluid distribution chamber 57 encloses the conical portion 54, as defined by a downward extension of the shell 50 and a dished annular bottom plate 58. The gaseous fluid enters the annular chamber 57 through an inlet pipe 60. After passing upwardly through the bed of downwardly moving pellets in the chamber 11 the heated fluid enters the free space 61 above the upper surface 62 of pellets in the upper portion of the chamber 11 and discharges through the refractory lined outlet duct 63. The outlet duct is shown particularly in Figs. 2, 5 and 6.

The arrangement of the lower ends of the throats 12 within the chamber 11 will determine the uniformity of the pellet withdrawal from the heating chambers 10, and thus will influence the degree of temperature uniformity of the pellets discharged through the throat conduits. As shown in Fig. 2, the lower ends of the conduits 12 open into the sides of the upper portion of the chamber 11 and are equally spaced in a circle which is coaxial with the vertical axis of the pellet outlet 55 and the chamber 11. Moreover the ends of the throats lie in a common horizontal plane. With this construction, each throat conduit 12 discharges pellets into equal segments of the chamber 11. Such an arrangement insures an equal pellet withdrawal rate through each of the conduits and through each of the pellet heating chambers 10. Although, in the construction illustrated, the throat conduits 12 are symmetrically arranged about the vertical axis of the chamber 11, so that the frictional resistance to pellet flow through each is essentially the same, it will be understood that a variation in pellet friction by reason of a difference in the length of individual conduits will not adversely affect, to any substantial extent, the distribution of pellet flow into the chamber 11. This is due to the flow controlling effect of the pellet distribution within the chamber 11, wherein the pellet delivery is made to equal segments of the chamber, and the outlet 55 at the bottom of the chamber is centrally located with respect to the throat outlets.

In operation, the pellets are circulated through the apparatus at a controlled rate as determined by the feeder 15, so that they are maintained in a fluent mass extending from a position intermediate the height of the surge bin 18 to the feeder 15. The heating fluid generated in the furnace 13 is produced by the combustion of a fluid fuel, where the temperature and composition of the heating fluid is easily regulated to meet the required pellet heating conditions. The pellets in moving from the surge bin 18 to the chambers 10 are distributed in accordance with the pellet withdrawal rate from the bottom of each chamber. With an equal withdrawal rate from each chamber, as assured by the described arrangement and relationship of the throats 12 and the chamber 11, the delivery of pellets to each of the heating chambers will also be substantially equal. The location and arrangement of the feed spouts 20 in the upper portion of each chamber 10 is such as to maintain the upper surface 48 of the downwardly moving beds of pellets in each heating chamber essentially uniform so that the resistance to flow of heating gas through each chamber will also be substantially equal. The heating fluid generated in the furnace 13 is substantially equally distributed to each of the heating chambers due to the uniformity of gaseous fluid pressures on opposite sides of each pellet bed. As a result of the susbtantially equal pellet and heating fluid flow rates through each of the chambers 10 the pellet discharge temperatures from each chamber are essentially the same.

It will be noted that the present invention provides apparatus for heating a large mass of moving heat transfer material to an exceptionally uniform temperature in a compact and readily controlled unit. The symmetrical arrangement of pellet and heating gas flow paths contribute to the efficient functioning of the unit in a structural arrangement whereby the refractory materials defining the flow paths are not subjected to high temperatures on all surfaces of the confining walls and can more readily support the weight of the moving pellet mass without structural failure.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What I claim is:

1. In heat transfer apparatus of the moving bed type, the combination comprising walls defining at least two upper chambers, a furnace source of heating fluid, means for passing said heating fluid through each of said chambers in proportion to the interior volume of each chamber, walls defining a lower chamber, means for passing a fluid to be heated through said lower chamber, a throat conduit directly connecting each of said upper chambers and said lower chamber, and means for causing a movement of a bed of fluent solid heat transfer material downwardly through said upper chambers, throat conduits and thence through said lower chamber.

2. In heat transfer apparatus of the moving bed type, the combination comprising walls defining a plurality of upper chambers having substantially similar dimensions, a furnace arranged for the generation of a gaseous heating fluid, a conduit between said furnace and each of said upper chambers constructed and arranged for a substantially equal flow of heating fluid to each of said chambers, walls defining a lower chamber, means for passing a fluid to be heated through said lower chamber, and means for maintaining a bed of gas-pervious solid particle materials moving continuously downwardly through said upper chambers to said lower chamber including a throat conduit directly connecting each of said upper chambers and said lower chamber and arranged for a substantially equal flow of solids through each conduit.

3. In heat transfer apparatus of the moving bed type, the combination comprising a plurality of upper chambers confining a similar bed of fluent solid heat transfer material in each, said upper chambers being at a common elevation and equally spaced circumferentially and radially about a common axis, a separate furnace coaxial with said common axis and arranged to generate a heating fluid therein by fuel combustion, circumferentially equally spaced heating fluid vestibules connecting said furnace with the lower portion of each of said upper chambers for a substantially equal flow of said heating fluid through each of the beds of heat transfer material, a lower chamber coaxial with the common axis of the upper chambers and confining therein a bed of fluent solid heat transfer material, means for passing a fluid to be heated through said bed in the lower chamber, a throat conduit directly connecting the bed of material in each of said upper chambers with the bed of material within said lower chamber, and means for causing a gravitational movement of said fluent solid material through said chambers, each of said throat conduits arranged for a substantially equal flow of said fluent solid material to said lower chamber.

4. Heat transfer apparatus comprising refractory walls defining a plurality of separate chambers symmetrically arranged about a common vertical axis, said chambers having substantially equal interior dimensions, each chamber having an inlet for a fluent solid heat transfer material and an outlet for spent heating fluid in the top and an outlet in the lower portion thereof for said heat transfer material, a lower chamber coaxially arranged with respect to said common vertical axis and having a centrally located outlet in the lower portion thereof for discharge of said fluent solid material, means for cooling said fluent solid material within said lower chamber by direct contact heat transfer relationship with a cooling gas, a throat conduit directly connecting each of said upper chambers with said lower chamber for movement of said fluent solid material downwardly therethrough, said throat conduits being arranged symmetrically about the vertical axis of said lower chamber for a substantially equal solid material flow through each, and means independent of said throat conduits for passing equal quantities of heating fluid through the fluent solid material in each of said upper chambers.

5. Heat transfer apparatus comprising refractory walls defining a plurality of separate heating chambers, each chamber having a fluent solid heat transfer material inlet and a spent heating fluid outlet in the top and a heat transfer material outlet in the lower portion thereof, a heat transfer material cooling chamber positioned below said heating chambers and having a centrally positioned fluent solid material outlet in the lower portion thereof, a throat conduit directly connecting each of said heating chambers with the lower chamber for parallel movement of said fluent solid material downwardly therethrough, said throat conduits opening into the lower chamber at positions equally radially spaced from and in a plane normal to the vertical centerline of the outlet from said lower chamber and equally spaced about the perimeter of said chamber for a solid material flow therethrough in proportion to the mass of said solid material in each of said upper chambers.

6. Heat transfer apparatus comprising refractory walls defining a plurality of separate chambers symmetrically arranged about a common vertical axis, said chambers having substantially identical interior dimensions, each chamber having an inlet for a fluent solid heat transfer material and an outlet for spent heating fluid in the top thereof and an outlet in the lower portion thereof for said heat transfer material, a lower chamber coaxially arranged with respect to said common vertical axis and having a centrally located outlet in the lower portion thereof for discharge of said fluent solid material, means for passing a fluid to be treated through said lower chamber, a throat conduit directly connecting each of said upper chambers with said lower chamber for movement of said fluent solid material downwardly therethrough in the form of a continuous column, said throat conduits being arranged symmetrically about the vertical axis of said lower chamber, a furnace for the generation of a heating fluid, and means independent of said throat conduits for passing equal quantities of heating fluid from said furnace through the fluent solid material in each of said upper chambers.

7. Heat transfer apparatus comprising refractory walls defining a plurality of separate chambers symmetrically arranged about a common vertical axis, each chamber having an inlet for fluent solid heat transfer material and an outlet for spent heating fluid in the top thereof and an outlet in the lower portion thereof for said heat transfer material, a lower chamber coaxially arranged with respect to said common vertical axis and having a centrally located outlet in the lower portion thereof for discharge of said fluent solid material, means for passing a fluid to be heated through said lower chamber, a throat conduit directly connecting each of said upper chambers with said lower chamber for movement of said fluent solid material downwardly therethrough, said throat conduits being arranged symmetrically about the vertical axis of said lower chamber, walls defining a furnace centrally positioned with respect to said upper chambers arranged for generation of a heating fluid therein, and a plurality of vestibules arranged to connect said furnace with the interior of each of said upper chambers for movement of heating fluid through the downwardly moving fluent solid material within the chambers.

8. Heat transfer apparatus comprising a plurality of separate closed chambers each confining a bed of heat transfer pellets, means for withdrawing pellets downwardly and in parallel from each of said chambers at a substantially equal rate, means for maintaining a substantially equal pellet bed depth in each chamber including a storage bin connected with each of said chambers for gravitational flow of pellets thereto as regulated by the withdrawal rate from each chamber, and a furnace arranged to generate heating gas by fuel combustion, said furnace positioned in a central location in respect to said chambers, and vestibules of substantially uniform length and cross section connecting said furnace with each of said chambers to deliver said heating gas to each of said chambers at substantially equal temperatures and pressures.

9. In heat transfer apparatus of the moving bed type, the combination comprising walls defining at least two upper chambers, walls defining a furnace source of heating gas, the walls of said upper chambers and said furnace being spaced apart whereby the exterior surfaces of said walls are exposed to the surrounding atmosphere, means for passing heating gas from said furnace simultaneously through each of said chambers, walls defining a lower chamber, means for passing a fluid to be heated through said lower chamber, a throat conduit directly connecting each of said upper chambers and said lower chamber, and means for causing a movement of a bed of fluent solid heat transfer material downwardly through said upper chambers and throat conduits and thence through said lower chamber.

ROBERT W. CURTIS.

REFERENCES CITED

The following references are of record in the file of this patent:

UNITED STATES PATENTS

| Number | Name | Date |
|---|---|---|
| 512,547 | Harmon | Jan. 9, 1894 |
| 1,102,714 | Bornmann | July 7, 1914 |
| 2,389,636 | Ramseyer | Nov. 27, 1945 |

FOREIGN PATENTS

| Number | Country | Date |
|---|---|---|
| 458,514 | France | Oct. 13, 1913 |